US012437183B2

(12) United States Patent
Khatamifard et al.

(10) Patent No.: US 12,437,183 B2
(45) Date of Patent: Oct. 7, 2025

(54) SUBTASK STORAGE FOR STREAMING CONVOLUTIONS IN NEURAL NETWORK PROCESSOR

(71) Applicant: Apple Inc., Cupertino, CA (US)

(72) Inventors: Sayyed Karen Khatamifard, Bellevue, WA (US); Chenfan Sun, Shoreline, WA (US); Alon Yaakov, Raanana (IL); Husam Khashiboun, Peqiin (IL); Jeffrey D Marker, Pleasant View, UT (US); Saman Naderiparizi, Seattle, WA (US); Ramana V Rachakonda, Austin, TX (US); Rohit K Gupta, Saratoga, CA (US)

(73) Assignee: APPLE INC., Cupertino, CA (US)

( * ) Notice: Subject to any disclaimer, the term of this patent is extended or adjusted under 35 U.S.C. 154(b) by 784 days.

(21) Appl. No.: 17/833,476

(22) Filed: Jun. 6, 2022

(65) Prior Publication Data
US 2023/0394276 A1 Dec. 7, 2023

(51) Int. Cl.
G06F 9/50 (2006.01)
G06F 9/48 (2006.01)
G06F 9/54 (2006.01)
G06N 3/04 (2023.01)

(52) U.S. Cl.
CPC ............ *G06N 3/04* (2013.01); *G06F 9/4881* (2013.01); *G06F 9/5016* (2013.01); *G06F 9/5038* (2013.01); *G06F 9/544* (2013.01); *G06F 2209/5017* (2013.01)

(58) Field of Classification Search
CPC .................................................... G06F 9/5016
See application file for complete search history.

(56) References Cited

U.S. PATENT DOCUMENTS 12,288,152 B2 * 4/2025 Coenen .................... G11C 8/08
2005/0144234 A1 * 6/2005 Tanaka .................. G06F 9/4881
709/205
2016/0379109 A1 12/2016 Chung et al.
(Continued)

OTHER PUBLICATIONS

He, Kaiming, et al. "Deep residual learning for image recognition." Proceedings of the IEEE conference on computer vision and pattern recognition. 2016. (Year: 2016).*

*Primary Examiner* — Charlie Sun
(74) *Attorney, Agent, or Firm* — Sterne, Kessler, Goldstein &Fox P.L.L.C.

(57) ABSTRACT

Embodiments relate to streaming convolution operations in a neural processor circuit that includes a neural engine circuit and a neural task manager. The neural task manager obtains multiple task descriptors and multiple subtask descriptors. Each task descriptor identifies a respective set of the convolution operations of a respective layer of a set of layers. Each subtask descriptor identifies a corresponding task descriptor and a subset of the convolution operations on a portion of a layer of the set of layers identified by the corresponding task descriptor. The neural processor circuit configures the neural engine circuit for execution of the subset of the convolution operations using the corresponding task descriptor. The neural engine circuit performs the subset of the convolution operations to generate output data that correspond to input data of another subset of the convolution operations identified by another subtask descriptor from the list of subtask descriptors.

20 Claims, 10 Drawing Sheets

(56) References Cited

U.S. PATENT DOCUMENTS

| | | |
|---|---|---|
| 2017/0206405 A1 | 7/2017 | Molchanov et al. |
| 2020/0034148 A1 | 1/2020 | Sumbul et al. |
| 2020/0160065 A1 | 5/2020 | Weinzaepfel |
| 2021/0097375 A1 | 4/2021 | Huynh et al. |
| 2022/0084499 A1 | 3/2022 | Chernenkov et al. |

* cited by examiner

SUBTASK STORAGE FOR STREAMING CONVOLUTIONS IN NEURAL NETWORK PROCESSOR

BACKGROUND

1. Field of the Disclosure

The present disclosure relates to performing operations related to neural networks, and more specifically to performing multiple layers of convolutions in a streaming manner as streaming subtasks.

2. Description of the Related Arts

An artificial neural network (ANN) is a computing system or model that uses a collection of connected nodes to process input data. The ANN is typically organized into layers where different layers perform different types of transformation on their input. Extensions or variants of ANN such as convolution neural network (CNN), recurrent neural networks (RNN) and deep belief networks (DBN) have come to receive much attention. These computing systems or models often involve extensive computing operations including multiplication and accumulation. For example, CNN is a class of machine learning technique that primarily uses convolution between input data and kernel data, which can be decomposed into multiplication and accumulation operations.

Depending on the types of input data and operations to be performed, these machine learning systems or models can be configured differently. Such varying configuration would include, for example, pre-processing operations, the number of channels in input data, kernel data to be used, non-linear function to be applied to convolution result, and applying of various post-processing operations. Using a central processing unit (CPU) and its main memory to instantiate and execute machine learning systems or models of various configuration is relatively easy because such systems or models can be instantiated with mere updates to code. However, relying solely on the CPU for various operations of these machine learning systems or models would consume significant bandwidth of the CPU as well as increase the overall power consumption.

SUMMARY

Embodiments relate to convolution operations performed in a streaming manner in a neural processor circuit by dividing the convolution operations into multiple subtasks. The neural processor circuit includes a neural engine circuit and a neural task manager. The neural task manager obtains a list of task descriptors and a list of subtask descriptors. Each task descriptor identifies a respective set of the convolution operations of a respective layer of a set of layers. Each subtask descriptor identifies a corresponding task descriptor in the list of task descriptors and a subset of the convolution operations on a portion of a layer (e.g., a subtask) of the set of layers identified by the corresponding task descriptor. The neural processor circuit configures the neural engine circuit for execution of the subset of the convolution operations using the corresponding task descriptor. The neural engine circuit performs the subset of the convolution operations to generate output data that correspond to input data of another subset of the convolution operations identified by another subtask descriptor from the list of subtask descriptors.

Figure 1:
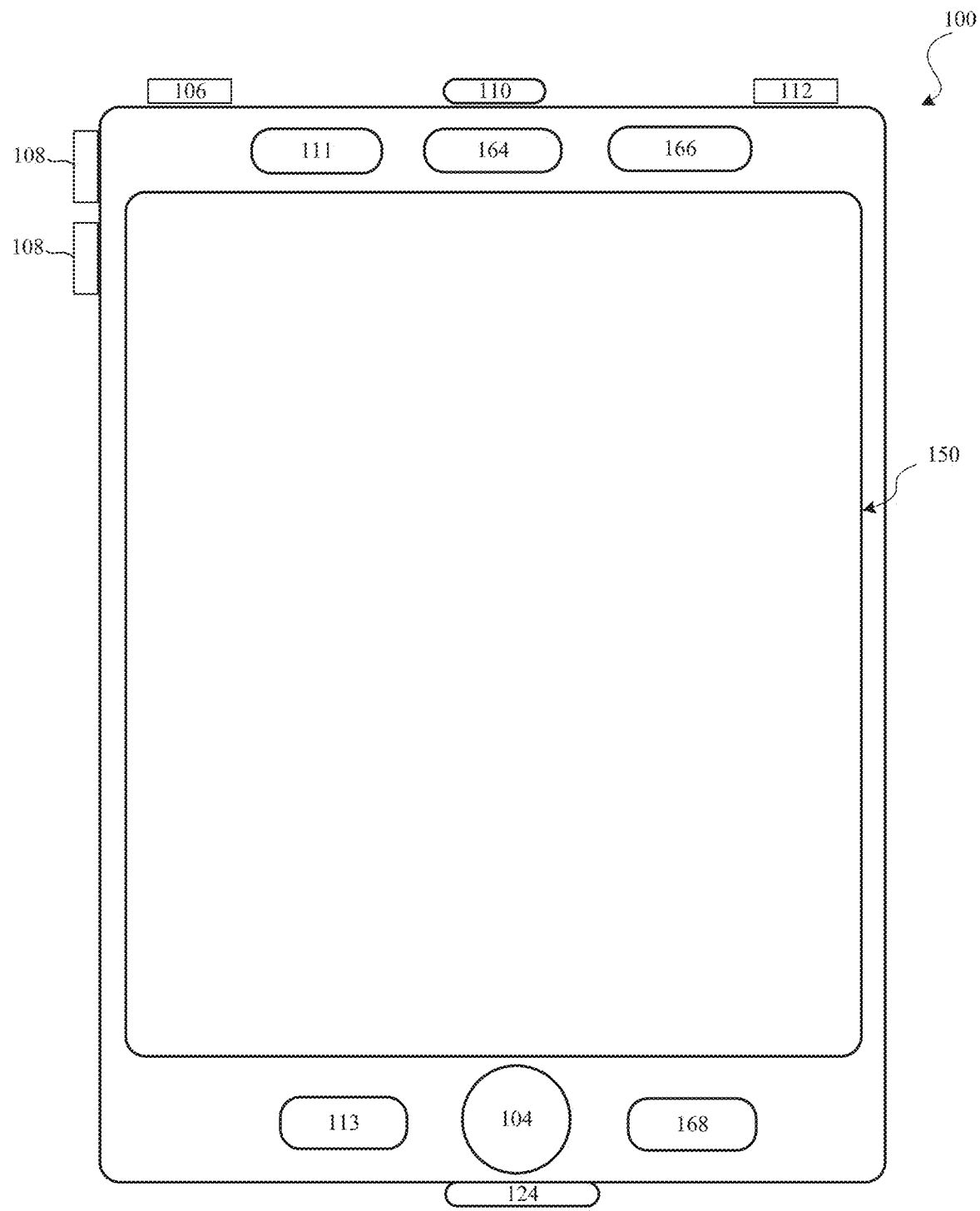
FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to preforming streaming convolution operations in a streaming manner (hereafter referred to also as "streaming convolution operations" or "streaming inference"). In the streaming convolution operations, multiple layers of convolution operations are executed in parallel, either physically or virtually. A portion of each layer may stream the most recent computed results immediately to a portion of the next convolutional layer. A partial output tensor generated by the portion of each layer may be used as a partial input tensor for the portion of the next convolutional layer. A subset of convolution operations on a portion of a layer may represent one subtask of multiple subtasks performed in the streaming manner. The streaming inference may be performed for all layers of a convolutional neural network, and by passing multiple times through each layer of the convolutional neural network until all data are processed and a complete final output (e.g., complete final inference) is generated.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, California. Other portable electronic devices, such as wearables, laptops or tablet computers, are optionally used. In some embodiments, the device is not a portable communication device, but is a desktop computer or other computing device that is not designed for portable use. In some embodiments, the disclosed electronic device may include a touch-sensitive surface (e.g., a touch screen display and/or a touchpad). An example electronic device described below in conjunction with Figure (FIG.) 1 (e.g., device 100) may include a touch-sensitive surface for receiving user input. The electronic device may also include one or more other physical user-interface devices, such as a physical keyboard, a mouse and/or a joystick.

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, headset jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors for facial recognition that is performed by one or more machine learning models stored in device 100. Device 100 may include components not shown in FIG. 1 such as an ambient light sensor, a dot projector and a flood illuminator that is to support facial recognition.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application-specific integrated circuits (ASICs).

Figure 2:
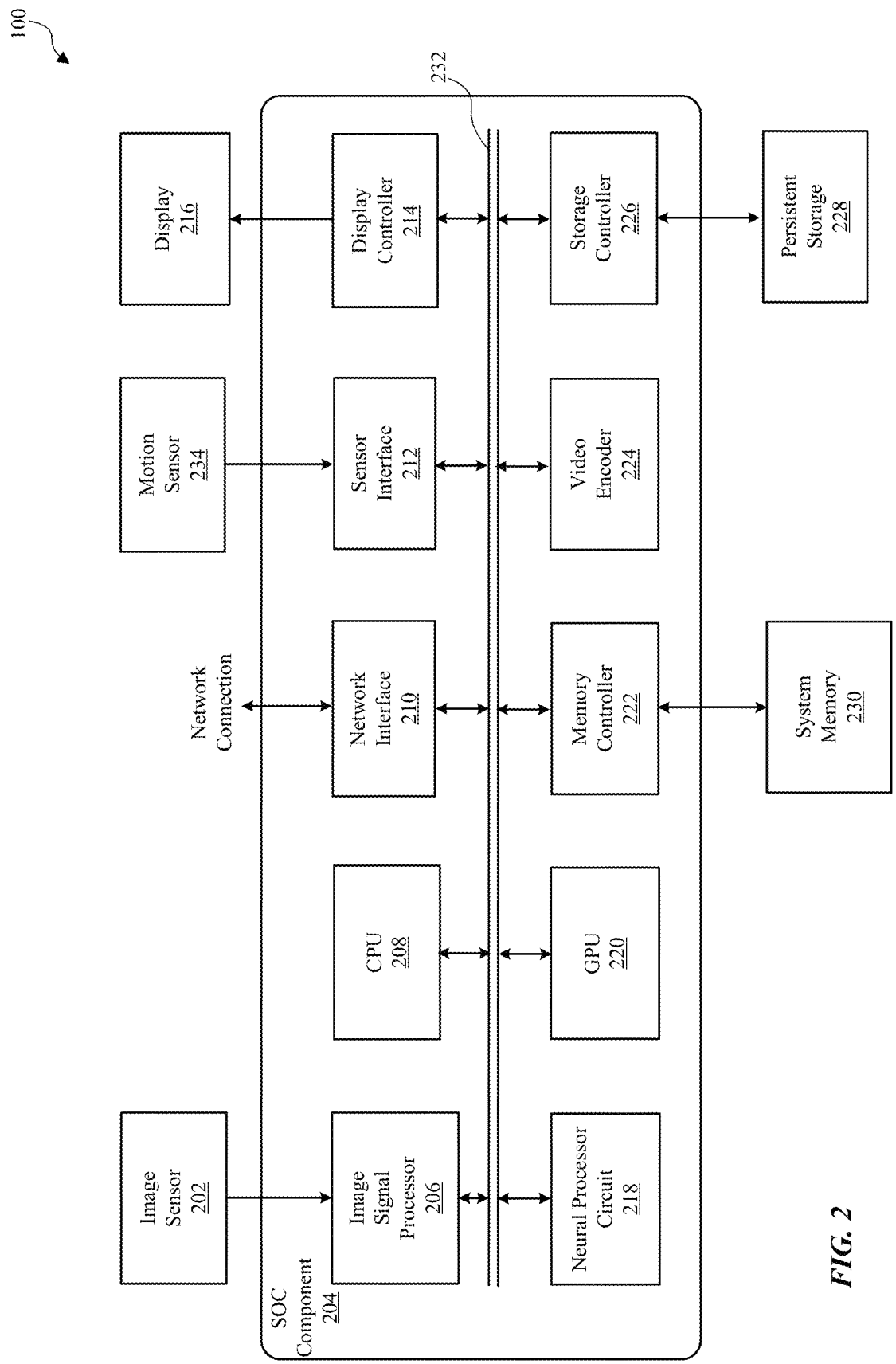
FIG. 2 is a block diagram illustrating components in the electronic device, according to one embodiment.

FIG. 2 is a block diagram illustrating components in device 100, according to one embodiment. Device 100 may perform various operations including implementing one or more machine learning models. For this and other purposes, device 100 may include, among other components, image sensors 202, a system-on-a chip (SOC) component 204, a system memory 230, a persistent storage (e.g., flash memory) 228, a motion sensor 234, and a display 216. The components as illustrated in FIG. 2 are merely illustrative. For example, device 100 may include other components (such as speaker or microphone) that are not illustrated in FIG. 2. Further, some components (such as motion sensor 234) may be omitted from device 100.

An image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color kernel array (CFA) pattern.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light-emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof.

Persistent storage 228 is a component for storing data in a non-volatile manner. Persistent storage 228 retains data even when power is not available. Persistent storage 228 may be embodied as read-only memory (ROM), flash memory or other non-volatile random access memory devices. Persistent storage 228 stores an operating system of device 100 and various software applications. Persistent storage 228 may also store one or more machine learning models, such as regression models, random forest models, support vector machines (SVMs) such as kernel SVMs, and artificial neural networks (ANNs) such as convolutional network networks (CNNs), recurrent network networks (RNNs), autoencoders, and long short term memory (LSTM). A machine learning model may be an independent model that works with the neural processor circuit 218 and various software applications or sensors of device 100. A machine learning model may also be part of a software application. The machine learning models may perform various tasks such as facial recognition, image classification, object, concept, and information classification, speech recognition, machine translation, voice recognition, voice command recognition, text recognition, text and context analysis, other natural language processing, predictions, and recommendations.

Various machine learning models stored in device 100 may be fully trained, untrained, or partially trained to allow device 100 to reinforce or continue to train the machine learning models as device 100 is used. Operations of the machine learning models include various computation used in training the models and determining results in runtime using the models. For example, in one case, device 100 captures facial images of the user and uses the images to continue to improve a machine learning model that is used to lock or unlock the device 100.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, neural processor circuit 218, graphics processor (GPU) 220, memory controller 222, video encoder 224, storage controller 226, and bus 232 connecting these subcomponents. SOC component 204 may include more or fewer subcomponents than those shown in FIG. 2.

ISP 206 is a circuit that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

GPU 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

Neural processor circuit 218 is a circuit that performs various machine learning operations based on computation including multiplication, addition, and accumulation. Such computation may be arranged to perform, for example, various types of tensor multiplications such as tensor product and convolution of input data and kernel data. Neural processor circuit 218 is a configurable circuit that performs these operations in a fast and power-efficient manner while relieving CPU 208 of resource-intensive operations associated with neural network operations. Neural processor circuit 218 may receive the input data from sensor interface 212, ISP 206, persistent storage 228, system memory 230 or other sources such as network interface 210 or GPU 220. The output of neural processor circuit 218 may be provided to various components of device 100 such as ISP 206, system memory 230 or CPU 208 for various operations. The structure and operation of neural processor circuit 218 are described below in detail with reference to FIG. 3.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to ISP 206) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 228 or for passing the data to network interface 210 for transmission over a network to another device.

In some embodiments, one or more subcomponents of SOC component 204 or some functionality of these subcomponents may be performed by software components executed on neural processor circuit 218, ISP 206, CPU 208 or GPU 220. Such software components may be stored in system memory 230, persistent storage 228 or another device communicating with device 100 via network interface 210.

Example Neural Processor Circuit

Neural processor circuit 218 is a programmable circuit that performs machine learning operations on the input data of neural processor circuit 218. Machine learning operations may include different computations for training of a machine learning model and for performing inference or prediction based on the trained machine learning model.

Taking an example of a CNN as the machine learning model, training of the CNN may include forward propagation and backpropagation. A neural network may include an input layer, an output layer, and one or more intermediate layers that may be referred to as hidden layers. Each layer may include one or more nodes, which may be fully or partially connected to other nodes in adjacent layers. In forward propagation, the neural network performs computation in the forward direction based on outputs of a preceding layer. The operation of a node may be defined by one or more functions. The functions that define the operation of a node may include various computation operation such as convolution of data with one or more kernels, pooling of layers, tensor multiplication, etc. The functions may also include an activation function that adjusts the weight of the output of the node. Nodes in different layers may be associated with different functions. For example, a CNN may include one or more convolutional layers that are mixed with pooling layers and are followed by one or more fully connected layers.

Each of the functions, including kernels, in a machine learning model may be associated with different coefficients that are adjustable during training. In addition, some of the nodes in a neural network each may also be associated with an activation function that decides the weight of the output of the node in a forward propagation. Common activation functions may include step functions, linear functions, sigmoid functions, hyperbolic tangent functions (tanh), and rectified linear unit functions (ReLU). After a batch of data of training samples passes through a neural network in the forward propagation, the results may be compared to the training labels of the training samples to compute the network's loss function, which represents the performance of the network. In turn, the neural network performs backpropagation by using coordinate descent such as stochastic coordinate descent (SGD) to adjust the coefficients in various functions to improve the value of the loss function.

In training, device 100 may use neural processor circuit 218 to perform all or some of the operations in the forward propagation and backpropagation. Multiple rounds of forward propagation and backpropagation may be performed by neural processor circuit 218, solely or in coordination with other processors such as CPU 208, GPU 220, and ISP 206. Training may be completed when the loss function no longer improves (e.g., the machine learning model has converged) or after a predetermined number of rounds for a particular set of training samples. As device 100 is used, device 100 may continue to collect additional training samples for the neural network.

For prediction or inference, device 100 may receive one or more input samples. Neural processor circuit 218 may take the input samples to perform forward propagation to determine one or more results. The input samples may be images, speeches, text files, sensor data, or other data.

Data and functions (e.g., input data, kernels, functions, layers outputs, gradient data) in machine learning may be saved and represented by one or more tensors. Common operations related to training and runtime of a machine learning model may include tensor product, tensor transpose, tensor elementwise operation, convolution, application of an activation function, automatic differentiation to determine gradient, statistics and aggregation of values in tensors (e.g., average, variance, standard deviation), tensor rank and size manipulation, etc.

While the training and runtime of a neural network is discussed as an example, neural processor circuit 218 may also be used for the operations of other types of machine learning models, such as a kernel SVM.

Figure 3:
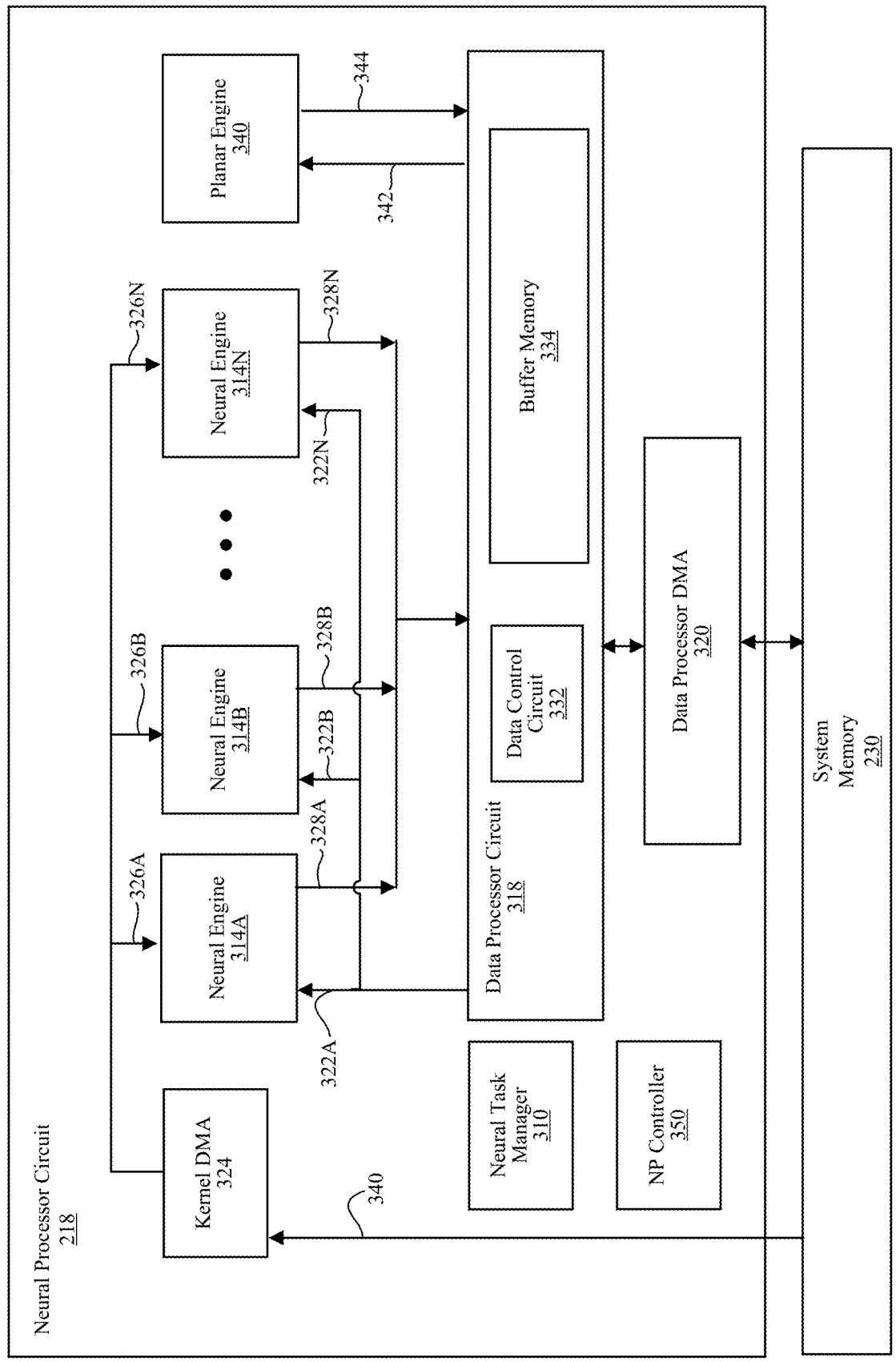
FIG. 3 is a block diagram illustrating a neural processor circuit, according to one embodiment.

Referring to FIG. 3, an example neural processor circuit 218 may include, among other components, a neural task manager 310, neural engines 314A through 314N (hereinafter collectively referred as "neural engines 314" and individually also referred to as "neural engine 314"), a kernel direct memory access (DMA) 324, a data processor circuit 318, a data processor DMA 320, and a planar engine 340. Neural processor circuit 218 may include fewer or additional components not illustrated in FIG. 3.

Each of neural engines 314 performs computing operations for machine learning in parallel. Depending on the load of operation, the entire set of neural engines 314 may be operating or only a subset of the neural engines 314 may be operating while the remaining neural engines 314 are placed in a power-saving mode to conserve power. Each of neural engines 314 includes components for storing one or more kernels, for performing multiply-accumulate operations, and for post-processing to generate an output data 328, as described below in detail with reference to FIG. 4A. Neural engines 314 may specialize in performing computation heavy operations such as convolution operations and tensor product operations. Convolution operations may include different kinds of convolutions, such as cross-channel convolutions (a convolution that accumulates values from different channels), channel-wise convolutions, and transposed convolutions. Different neural engines 314 may process different tensor inputs. Alternatively, one neural engine 314 may process different tensor inputs.

Planar engine 340 may specialize in performing simpler computing operations whose speed may primarily depend on the input and output (I/O) speed of the data transmission instead of the computation speed within planar engine 340. Those computing operations may be referred to as I/O bound computations. In contrast, neural engines 314 may focus on complex computation whose speed may primarily depend on the computation speed within each neural engine 314. For example, planar engine 340 is efficient at performing operations within a single channel while neural engines 314 are efficient at performing operations across multiple channels that may involve heavy accumulation of data. The use of neural engine 314 to compute I/O bound computations may not be efficient in terms of both speed and power consumption. In one embodiment, input data may be a tensor whose rank is larger than three (e.g., having three or more dimensions). A set of dimensions (two or more) in the tensor may be referred to as a plane while another dimension may be referred to as a channel. Neural engines 314 may convolve data of a plane in the tensor with a kernel and accumulate results of the convolution of different planes across different channels. On the other hand, planar engine 340 may specialize in operations within the plane.

The circuitry of planar engine 340 may be programmed for operation in one of multiple modes, including a pooling mode, an elementwise mode, and a reduction mode. In the pooling mode, planar engine 340 reduces a spatial size of input data. In the elementwise mode, planar engine 340 generates an output that is derived from elementwise operations of one or more inputs. In the reduction mode, planar engine 340 reduces the rank of a tensor. For example, a rank 5 tensor may be reduced to a rank 2 tensor, or a rank 3 tensor may be reduced to a rank 0 tensor (e.g., a scalar). In some embodiments, planar engine 340 is omitted from neural processor circuit 218.

Neural task manager 310 manages the overall operation of neural processor circuit 218. Neural task manager 310 may receive a task list from a compiler executed by CPU 208, store tasks in its task queues, choose a task to perform, and send task commands to other components of neural processor circuit 218 for performing the chosen task. Data may be associated with a task command that indicates the types of operations to be performed on the data. Data of neural processor circuit 218 includes input data that is transmitted from another source such as system memory 230, and data generated by neural processor circuit 218 in a previous operating cycle. Each dataset may be associated with a task command that specifies the type of operations to be performed on the data. Neural task manager 310 may also perform switching of tasks on detection of events such as receiving instructions from CPU 208. In one or more embodiments, neural task manager 310 sends rasterizer information to the components of neural processor circuit 218 to enable each of the components to track, retrieve or process appropriate segments of the input data and kernel data. For example, neural task manager 310 may include registers that store the information regarding the size and rank of a dataset for processing by neural processor circuit 218. Although neural task manager 310 is illustrated in FIG. 3 as part of neural processor circuit 218, neural task manager 310 may be a component outside neural processor circuit 218. Neural task manager 310 may also store a list of task descriptors and a list of subtask descriptors for performing streaming convolution operations at one or more neural engines 314. Details about a structure and operations of neural task manager 310 are described below with reference to FIGS. 6 through 8.

Kernel DMA 324 is a read circuit that fetches kernel data from a source (e.g., system memory 230) and sends kernel data 326A through 326N to each of neural engines 314. Kernel data represents information from which kernel elements can be extracted. In one embodiment, the kernel data may be in a compressed format which is decompressed at each of neural engines 314. Although kernel data provided to each of neural engines 314 may be the same in some instances, the kernel data provided to each of neural engines 314 is different in most instances. In one embodiment, the direct memory access nature of kernel DMA 324 may allow kernel DMA 324 to fetch and write data directly from the source without the involvement of CPU 208.

Data processor circuit 318 manages data traffic and task performance of neural processor circuit 218. Data processor circuit 318 may include a data control circuit 332 and a buffer memory 334. Buffer memory 334 is temporary storage for storing data associated with operations of neural processor circuit 218 and planar engine 340, such as input data that is transmitted from system memory 230 (e.g., data from a machine learning model) and other data that is generated within neural processor circuit 218 or planar engine 340. The data stored in data processor circuit 318 may include different subsets that are sent to various downstream components, such as neural engines 314 and planar engine 340.

In one embodiment, buffer memory 334 is embodied as a non-transitory memory that can be accessed by neural engines 314 and planar engine 340. Buffer memory 334 may be a direct memory access buffer that stores data of a machine learning model of device 100 without involvement of CPU 208. Buffer memory 334 may store input data 322A through 322N for feeding to corresponding neural engines 314A through 314N or planar engine 340, as well as output data 328A through 328N from each of neural engines 314A through 314N or planar engine 340 for feeding back into one or more neural engines 314 or planar engine 340, or sending to a target circuit (e.g., system memory 230). Buffer memory 334 may also store input data 342 and output data 344 of planar engine 340 and allow the exchange of data between neural engine 314 and planar engine 340. For example, one or more output data 328A through 328N of neural engines 314 are used as input data 342 to planar engine 340. Likewise, output data 344 of planar engine 340 may be used as input data 322A through 322N of neural engines 314. The inputs of neural engines 314 or planar engine 340 may be any data stored in buffer memory 334. For example, in various operating cycles, the source datasets from which one of the engines fetches as inputs may be different. The input of an engine may be an output of the same engine in previous operating cycles, outputs of different engines, or any other suitable source datasets stored in buffer memory 334. Also, a dataset in buffer memory 334 may be divided and sent to different engines for different operations in the next operating cycle. Two datasets in buffer memory 334 may also be joined for the next operation. A structure of buffer memory 334 may support streaming convolution operations executed at one or more neural engines 314.

Data control circuit 332 of data processor circuit 318 may control the exchange of data between neural engines 314 and planar engine 340. The operations of data processor circuit 318 and other components of neural processor circuit 218 are coordinated so that the input data and intermediate data stored in data processor circuit 318 may be reused across multiple operations at neural engines 314 and planar engine 340, thereby reducing data transfer to and from system memory 230. Data control circuit 332 may perform one or more of the following operations: (i) monitor the size and rank of data (e.g. data may be one or more tensors) that are being processed by neural engines 314 and planar engine 340, (ii) determine which subsets of data are transmitted to neural engines 314 or to planar engine 340 based on the task commands associated with different subsets of data, (iii) determine the manner in which data is transmitted to neural engines 314 and planar engine 340 (e.g., data processor circuit 318 may operate in a broadcast mode where the same data is fed to multiple input channels of neural engines 314 so that multiple or all neural engines 314 receive the same data or in a unicast mode where different neural engines 314 receives different data), and (iv) transmit a configuration command to planar engine 340 to direct planar engine 340 to program itself for operating in one of multiple operation modes.

The data of neural processor circuit 218 stored in buffer memory 334 may be part of, among others, image data, histogram of oriented gradients (HOG) data, audio data, metadata, output data 328 of a previous operating cycle of neural engine 314, and other processed data received from other components of SOC component 204.

Data processor DMA 320 includes a read circuit that receives a portion of input data from a source (e.g., system memory 230) for storing in buffer memory 334, and a write circuit that forwards data from buffer memory 334 to a target component (e.g., system memory 230). In one embodiment, the direct memory access nature of data processor DMA 320 may allow data processor DMA 320 to fetch and write data directly from a source (e.g., system memory 230) without the involvement of CPU 208. Buffer memory 334 may be a direct memory access buffer that stores data of a machine learning model of device 100 without the involvement of CPU 208.

Neural Processor (NP) controller 350 is a control circuit that performs various operations to control the overall operation of neural processor circuit 218. NP controller 350 may interface with CPU 208, program components of neural processor circuit 218 by setting register in the components and perform housekeeping operations. NP controller 350 may also initialize components in neural processor circuit 218 when neural processor circuit 218 is turned on.

Example Neural Engine Architecture

Figure 4A:
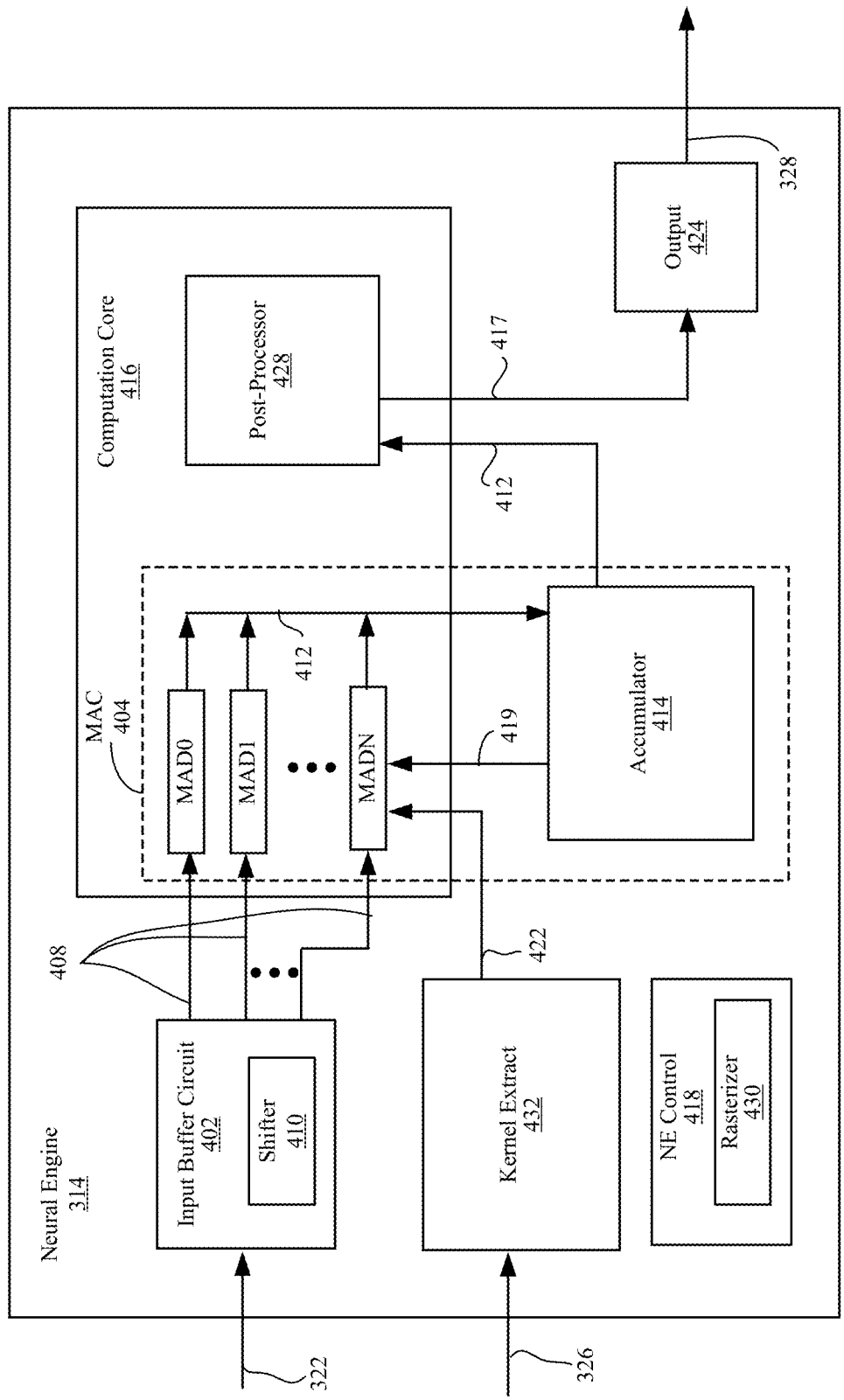
FIG. 4A is a block diagram of a neural engine in the neural processor circuit, according to one embodiment.

FIG. 4A is a block diagram of neural engine 314, according to one embodiment. Neural engine 314 performs various operations to facilitate machine learning such as convolution, tensor product, and other operations may involve heavy computation. For this purpose, neural engine 314 receives input data 322, performs multiply-accumulate operations (e.g., convolution operations) on input data 322 based on stored kernel data, performs further post-processing operations on the result of the multiply-accumulate operations, and generates output data 328. Input data 322 and/or output data 328 of neural engine 314 may be of a single channel or span across multiple channels.

Neural engine 314 may include, among other components, input buffer circuit 402, computation core 416, neural engine (NE) control 418, kernel extract circuit 432, accumulator circuit 414 and output circuit 424. Neural engine 314 may include fewer components than what is illustrated in FIG. 4A or include further components not illustrated in FIG. 4A.

Input buffer circuit 402 is a circuit that stores a subset of the data of neural processor circuit 218 as the subset of data is received from a source. The source may be data processor circuit 318, planar engine 340, or another suitable component. Input buffer circuit 402 sends an appropriate segment 408 of data for a current task or process loop to computation core 416 for processing. Input buffer circuit 402 may include a shifter 410 that shifts read locations of input buffer circuit 402 to change segment 408 of data sent to computation core 416. By changing segments of input data provided to computation core 416 via shifting, neural engine 314 can perform multiply-accumulate for different segments of input data based on a fewer number of read operations. In one or more embodiments, the data of neural processor circuit 218 includes data of difference convolution groups and/or input channels.

Kernel extract circuit 432 is a circuit that receives kernel data 326 from kernel DMA 324 and extracts kernel coefficients 422. In one embodiment, kernel extract circuit 432 references a lookup table (LUT) and uses a mask to reconstruct a kernel from compressed kernel data 326 based on the LUT. The mask indicates locations in the reconstructed kernel to be padded with zero and remaining locations to be filled with numbers. Kernel coefficients 422 of the reconstructed kernel are sent to computation core 416 to populate register in multiply-add (MAD) circuits of computation core 416. In other embodiments, kernel extract circuit 432 receives kernel data in an uncompressed format and the kernel coefficients are determined without referencing a LUT or using a mask.

Computation core 416 is a programmable circuit that performs computation operations. For this purpose, computation core 416 may include MAD circuits MAD0 through MADN and a post-processor 428. Each of MAD circuits MAD0 through MADN may store an input value in segment 408 of the input data and a corresponding kernel coefficient in kernel coefficients 422. The input value and the corresponding kernel coefficient are multiplied in each of MAD circuits to generate a processed value 412.

Accumulator circuit 414 is a memory circuit that receives and stores processed values 412 from MAD circuits. The processed values stored in accumulator circuit 414 may be sent back as feedback information 419 for further multiply and add operations at MAD circuits or sent to post-processor 428 for post-processing. Accumulator circuit 414 in combination with MAD circuits form a multiply-accumulator (MAC) 404. In one or more embodiments, accumulator circuit 414 may have subunits (or batches) where each subunit sends data to different components of neural engine 314. For example, during an operating cycle, data stored in a first subunit of accumulator circuit 414 is sent to MAC 404 while data stored in a second subunit of accumulator circuit 414 is sent to post-processor 428.

Post-processor 428 is a circuit that performs further processing of values 412 received from accumulator circuit 414. Post-processor 428 may perform operations including, but not limited to, applying linear functions (e.g., Rectified Linear Unit (ReLU)), normalized cross-correlation (NCC), merging the results of performing neural operations on 8-bit data into 16-bit data, and local response normalization (LRN). The result of such operations is output from post-processor 428 as processed values 417 to output circuit 424. In some embodiments, the processing at post-processor 428 is bypassed. For example, the data in accumulator circuit 414 may be sent directly to output circuit 424 for access by other components of neural processor circuit 218.

NE control 418 controls operations of other components of neural engine 314 based on the operation modes and parameters of neural processor circuit 218. Depending on different modes of operation (e.g., group convolution mode or non-group convolution mode) or parameters (e.g., the number of input channels and the number of output channels), neural engine 314 may operate on different input data in different sequences, return different values from accumulator circuit 414 to MAD circuits, and perform different types of post-processing operations at post-processor 428. To configure components of neural engine 314 to operate in a desired manner, NE control 418 sends task commands that may be included in information 419 to components of neural engine 314. NE control 418 may include a rasterizer 430 that tracks the current task or process loop being processed at neural engine 314.

Input data is typically split into smaller pieces of data for parallel processing at multiple neural engines 314 or neural engines 314 and planar engine 340. A set of data used for a convolution operation may be referred to as a convolution group, which can be split into multiple smaller units. The hierarchy of smaller units (segments) may be convolution groups, slices, tiles, work units, output channel groups, input channels (Cin), sub-Cins for input stride, etc. For example, a convolution group may be split into several slices; a slice may be split into several tiles; a tile may be split into several work units; and so forth. In the context of neural engine 314, a work unit may be a segment of the input data, such as data processed by planar engine 340 or data processed during a prior operating cycle of neural engines 314 having a size that produces output values that fit into accumulator circuit 414 of neural engine 314 during a single operating cycle of computation core 416. In one case, the size of each work unit is 256 bytes. In such embodiments, for example, work units can be shaped to one of 16×16, 32×8, 64×4, 128×2 or 256×1 datasets. In the context of planar engine 340, a work unit may be (i) a segment of input data, (ii) data from neural engine 314 or (iii) data from a prior operating cycle of planar engine 340 that can be processed simultaneously at planar engine 340.

Rasterizer 430 may perform the operations associated with dividing the input data into smaller units (segments) and regulate the processing of the smaller units through MACs 404 and accumulator circuit 414. Rasterizer 430 keeps track of sizes and ranks of segments of the input/output data (e.g., groups, work units, input channels, output channels) and instructs the components of a neural processor circuit 218 for proper handling of the segments of the input data. For example, rasterizer 430 operates shifters 410 in input buffer circuits 402 to forward correct segments 408 of input data to MAC 404 and send the finished output data 328 to data buffer memory 334. Other components of neural processor circuit 218 (e.g., kernel DMA 324, buffer DMA 320, buffer memory 334, planar engine 340) may also have their corresponding rasterizers to monitor the division of input data and the parallel computation of various segments of input data in different components.

Output circuit 424 receives processed values 417 from post-processor 428 and interfaces with data processor circuit 318 to store processed values 417 in data processor circuit 318. For this purpose, output circuit 424 may send out output data 328 in a sequence or a format that is different from the sequence or format in which the processed values 417 are processed in post-processor 428.

The components in neural engine 314 may be configured during a configuration period by NE control 418 and neural task manager 310. For this purpose, neural task manager 310 sends configuration information to neural engine 314 during the configuration period. The configurable parameters and modes may include, but are not limited to, mapping between input data elements and kernel elements, the number of input channels, the number of output channels, performing of output strides, and enabling/selection of post-processing operations at post-processor 428.

Example Streaming Convolution

Embodiments of the present disclosure relate to performing streaming convolution operations. In the streaming convolution operations, multiple layers of a CNN execute convolution operations in parallel, either physically or virtually. Each layer may stream the most recent computed results immediately to the next convolutional layer. Additionally, buffers associated with each layer may store only a part of input data as needed for its convolution operations, instead of the entire input tensor (as it would be done in the layer-by-layer inference). Hence, the memory footprint required for streaming convolution operations becomes equal to a sum of tensor buffers used for storage of partial input tensors. On the other hand, the memory footprint required for the layer-by-layer inference depends on a layer that requires the largest total memory size to store input and output tensors simultaneously, which can be substantially larger than the required memory footprint for the streaming convolutions. Furthermore, performing convolution operations in a streaming manner can also improve an overall latency of the CNN. In the case of streaming convolution operations, a first output element (e.g., pixel value) of an output tensor of the CNN can be computed as soon as enough input data is fed to a neural engine circuit. Hence, a first-pixel-to-first-pixel latency of the CNN implemented at the neural engine circuit as streaming convolution operations can be significantly better compared to a first-pixel-to-first-pixel latency of a CNN implemented at a neural engine circuit as layer-by-layer convolution operations.

Figure 4B:
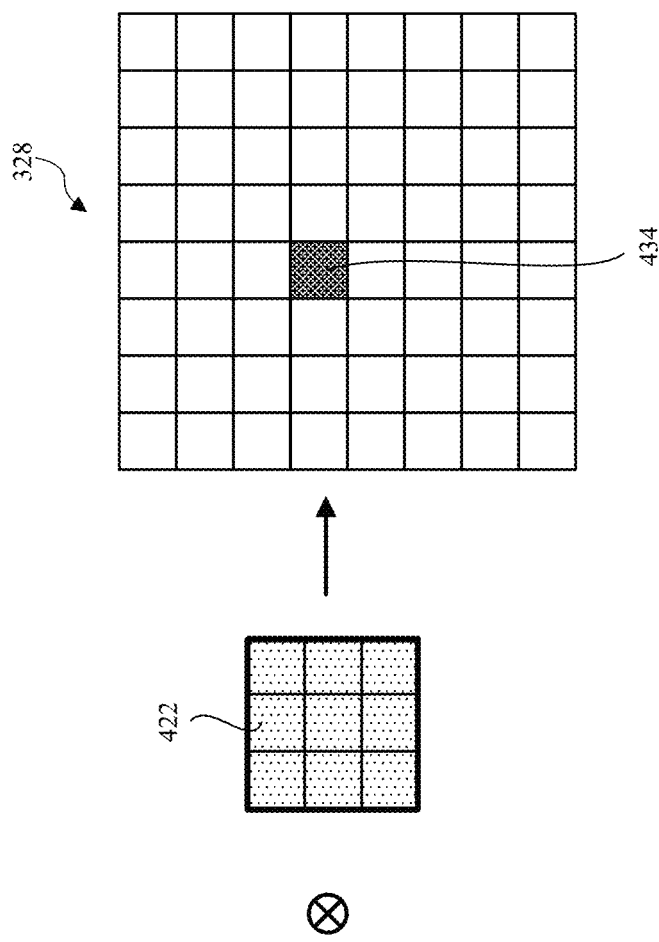
FIG. 4B illustrates an example convolution operation performed in a streaming manner at the neural engine of FIG. 4A, according to one embodiment.
Figure 4B:
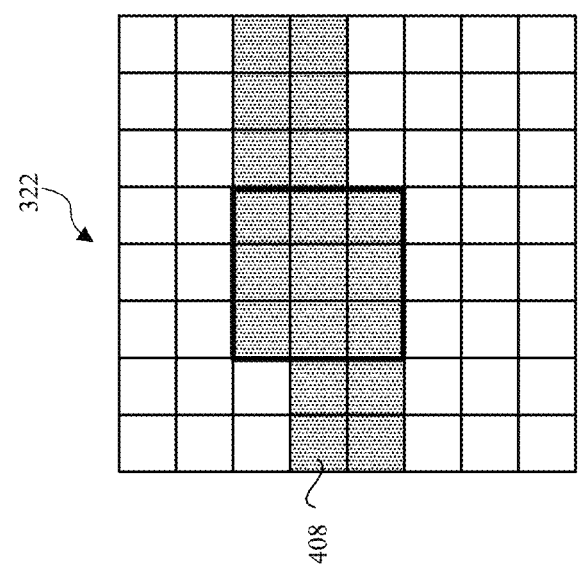

FIG. 4B illustrates an example convolution operation performed in a streaming manner at neural engine 314, according to one embodiment. The example convolution operation of FIG. 4B is a convolution of kernel coefficients 422 of size 3 by 3 by 1 with input data 322 (e.g., input tensor) of size 10 by 10 by 1 (e.g., monochrome image data), which generates output data 328 (e.g., output tensor) of size 10 by 10 by 1. The example convolution operation of FIG. 4B can be a convolution operation of one convolution layer out of multiple convolution layers in a CNN. Segment 408 of the input data may stream in from a previous layer (e.g., in raster-scan, left-to-right and then top-to-bottom). Alternatively, segment 408 of the input data may be received from system memory 230 or from image signal processor 206. To compute an output element 434 in output data 328, neural engine 314 would only process segment 408 of the input data. Thus, only segment 408 of the input data corresponding to a partial input tensor (e.g., two rows and two input elements of input data 322) may be stored in, e.g., buffer memory 334, to generate output element 434.

In the next computational cycle, a new input element of input data 322 would arrive (e.g., from buffer memory 334) as being generated from the previous layer, and consequently, neural engine 314 would compute a next output element of output tensor 328. However, a size of the partial input tensor stored in buffer memory 334 does not change, and older input element(s) of input data 322 can be evicted from buffer memory 334 since the older input element(s) of input data 322 are not used for processing again. Hence, for the streaming convolution operations, only the partial input tensor (e.g., two rows and two input elements of input data 322) may be stored in buffer memory 334, instead of buffering the entire input data 322.

Figure 5:
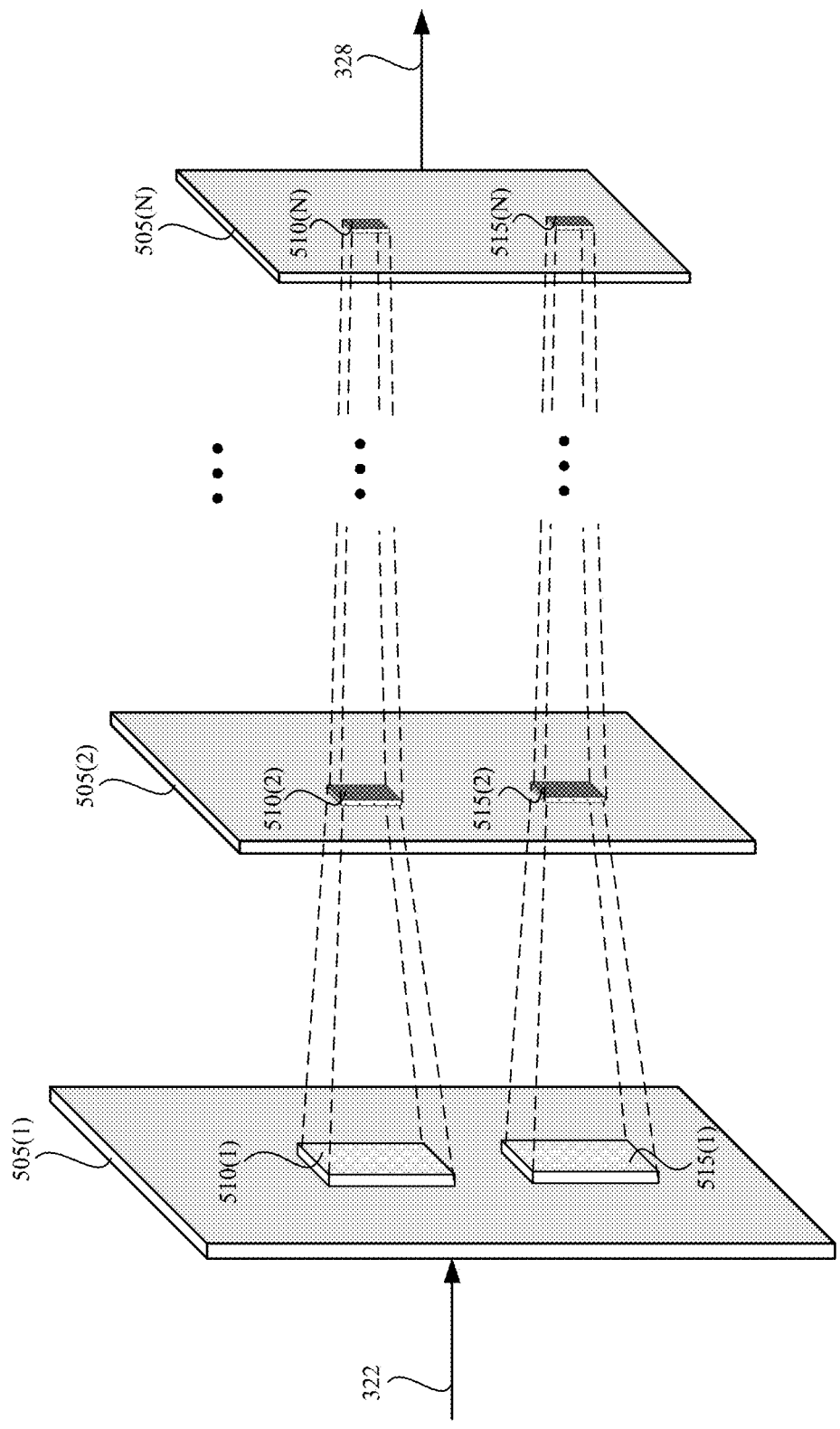
FIG. 5 illustrates an example of performing convolution operations on multiple convolution layers in a streaming manner, according to one embodiment.

FIG. 5 illustrates an example streaming inference 500 performed on multiple convolution layers, according to one embodiment. Streaming inference 500 may comprise multiple sets of convolution operations, each set of convolution operations being performed on a respective layer 505(1), 505(2), . . . , 505(N), where N is the total number of layers in streaming inference 500. Streaming inference 500 represents an example of streaming convolutions in a straight-forward linear neural network. However, the same principle of streaming convolutions can be also utilized in neural networks with residual paths, as well as in neural networks with concatenation operations. Layer 505(1) may be a layer of the lowest hierarchy, and layer 505(N) may be a layer of the highest hierarchy. And layer 505(n+1) may be a layer of a higher hierarchy than layer 505(n), where n=1, 2, . . . , N−1. Neural engine 314 may perform first convolution operations on a first input tensor (e.g., input data 322) of layer 505(1) to generate a first output tensor. Neural engine 314 may further perform second convolution operations on a second input tensor of layer 505(2) at a higher hierarchy than layer 505(1) to generate a second output tensor, the second input tensor corresponding to the first output tensor. And (e.g., for N>2), neural engine 314 may perform the N-th convolution operations on an N-th input tensor of a layer 505(N) at a higher hierarchy than layer 505(N−1) to generate output data 328, the N-th input tensor corresponding to the (N−1)-th output tensor.

Each output tensor of a respective layer 505(n) (n=1, 2, . . . , N−1) is not computed in a layer-by-layer manner, but instead a partial output tensor is computed by layer 505(n) before starting convolution operations of a next layer 505(n+1) using the partial output tensor generated by layer 505(n) as an input into layer 505(n+1). Partial tensors 510(1) through 510(N) may be processed (or generated) followed by processing (or generating) partial tensors 515(1) through 515(N). That is processing (or generating) partial tensors 510(2) through 510(N) may be performed before processing partial tensor 515(1). Partial tensors 510(1) through 510(N) may correspond to a first pass through N layers of streaming inference 500, and partial tensors 515(1) through 515(N) may correspond to a second pass through N layers of streaming inference 500 subsequent to the first pass.

Data control circuit 332 may first store a first portion 510(1) of the first input tensor in buffer memory 334. Before being stored in buffer memory 334, first portion of first input tensor 510(1) may be fetched at data processor circuit 318 from, e.g., system memory 230 via data processor DMA 320. Alternatively, first portion of first input tensor 510(1) may be generated by planar engine 340 as part of output data 344. Neural engine 314 may access first portion of first input tensor 510(1) stored in buffer memory 334 as input data 322 to perform a first subset of the first convolution operations of layer 505(1) and generate a first portion 510(2) of the first output tensor of layer 505(2) at a first time. First portion of first output tensor 510(2) may also be referred to as a first portion 510(2) of the second input tensor of layer 505(2). Data processor circuit 318 may receive first portion of first output tensor 510(2) as output data 328, and data control circuit 332 may store the received first portion of first output tensor 510(2) in buffer memory 334. Neural engine 314 may access first portion of second input tensor 510(2) stored in buffer memory 334 as input data 322 to perform a first subset of the second convolution operations of layer 505(2) at a second time subsequent to the first time.

The process of performing subsets of convolution operations in the streaming manner can be continued for all N layers. For the last N-th layer, neural engine 314 may perform a first subset of N-th convolution operations to generate a first portion 510(N) of output data 328. Once the first subset of N-th convolution operations is finished and first portion of output data 510(N) is generated, the first pass through N layers of streaming inference 500 ends.

At the beginning of the second pass, data control circuit 332 may store a second portion 515(1) of the first input tensor in buffer memory 334. Before being stored in buffer memory 334, second portion of first input tensor 515(1) may be fetched at data processor circuit 318 from, e.g., system memory 230 via data processor DMA 320. Alternatively, second portion of first input tensor 515(1) may be generated by planar engine 340 as part of output data 344. Neural engine 314 may access second portion of first input tensor 515(1) stored in buffer memory 334 as input data 322 to perform a second subset of the first convolution operations of layer 505(1) and generate a second portion 515(2) of first output tensor of layer 505(2). Second portion of first output tensor 515(2) may be also referred to as a second portion 515(2) of second input tensor of layer 505(2). Data processor circuit 318 may receive second portion of first output tensor 515(2) as output data 328, and data control circuit 332 may store the received second portion of first output tensor 515(2) in buffer memory 334. Neural engine 314 may access second portion of second input tensor 515(2) stored in buffer memory 334 as input data 322 to perform a second subset of the second convolution operations of layer 505(2).

The process of performing subsets of convolution operations in a streaming manner can be continued for all N layers. For the last N-th layer, neural engine 314 may perform a second subset of the N-th convolution operations to generate a second portion 515(N) of output data 328. Once the second subset of N-th convolution operations is finished and second portion of output data 515(N) is generated, the second pass through N layers of streaming inference 500 ends. The process of repeating subsets of convolution operations for N layers of streaming inference 500 can be performed for, e.g., M passes through layers 505(1), . . . , 505(N), where M≥2. In the last M-th pass of streaming inference 500, a last remaining portion of input data 322 (e.g., last portion of input tensor of layer 505(1)) may be processed at neural engine 314, and a last remaining portion of output data 328 may be generated after finishing a last remaining subset of the N-th convolution operations of layer 505(N).

Example Neural Task Manager for Streaming Convolution

Figure 6:
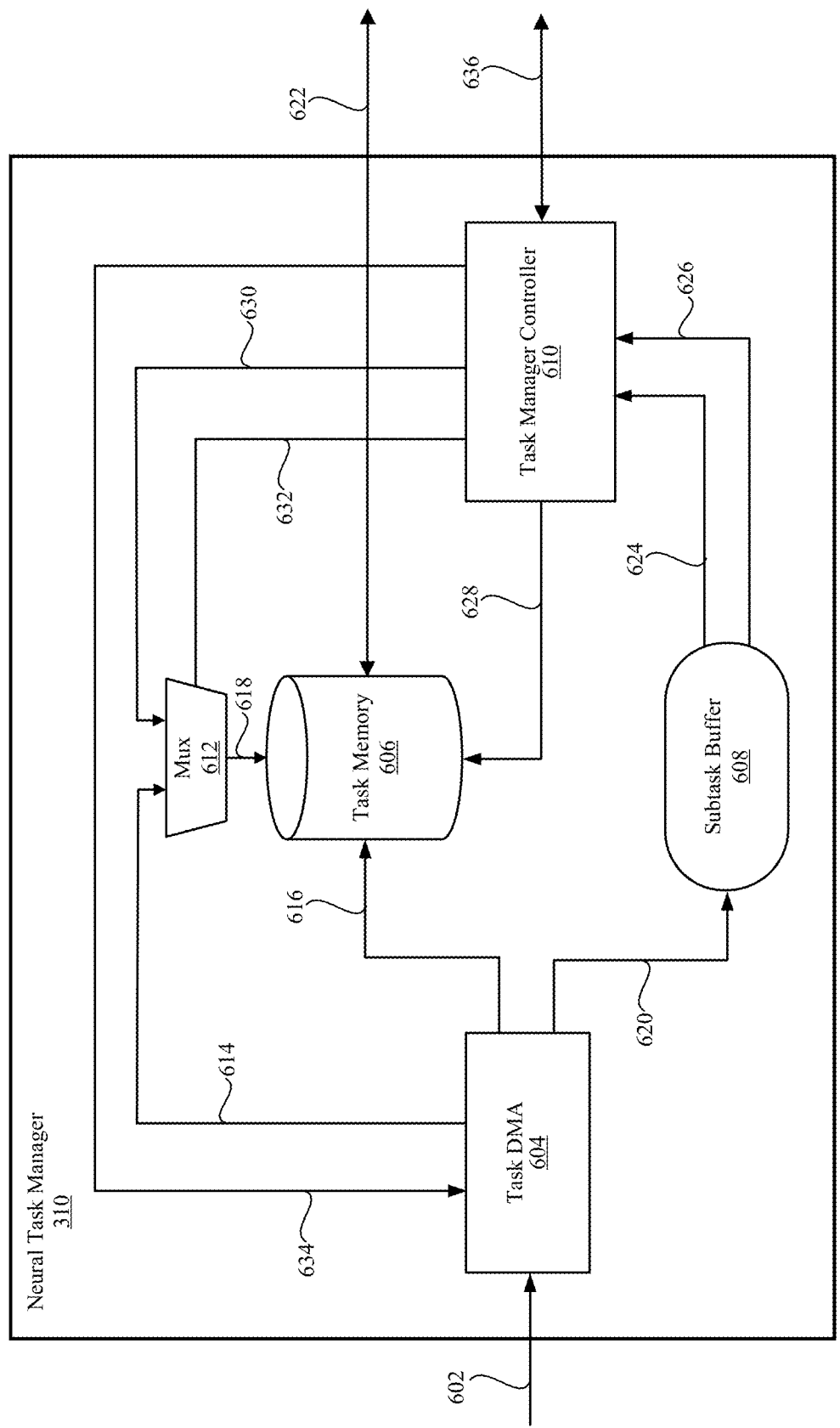
FIG. 6 is a block diagram of a neural task manager of the neural processor circuit, according to one embodiment.

FIG. 6 is a block diagram of neural task manager 310, according to one embodiment. Neural task manager 310 may store and manage a list of task descriptors and a list of subtask descriptors for performing streaming convolution operations at one or more neural engines 314, such as streaming inference 500. In some embodiments, a compiler (or some other software components of device 100) generates the list of task descriptors and the list of subtask descriptors, and stores the generated lists of task descriptors and subtask descriptors into, e.g., a task file. The task file may be stored in system memory 230, persistent storage 228, buffer memory 334, some other non-transitory computer readable storage media of device 100, or some combination thereof. Alternatively, a hardware component of neural processor circuit 218 (e.g., NP controller 350, data control circuit 332 or some other circuit) may generate the list of task descriptors and the list of subtask descriptors. Neural task manager 310 may include a task DMA 604, a task memory 606 coupled to task DMA 604 (e.g., via a multiplexer 612), a subtask buffer 608 coupled to task DMA 604, and a task manager controller 610 coupled to subtask buffer 608 and task DMA 604 (e.g., via multiplexer 612). Neural task manager 310 may include fewer components than what is illustrated in FIG. 6 or include further components not illustrated in FIG. 6.

Task DMA 604 may load the list of task descriptors and the list of subtask descriptors from, e.g., system memory 230, persistent storage 228, buffer memory 334, some other non-transitory computer readable storage media of device 100, or some combination thereof. During each computational cycle (e.g., clock cycle), task DMA 604 may receive data 602 including at least one task descriptor and/or multiple subtask descriptors. Each task descriptor may identify a respective set of convolution operations of a respective layer in a CNN (e.g., a respective layer 505(1), layer 505(2), . . . , 505(N) in FIG. 5). Each subtask descriptor may identify a corresponding task descriptor and a subset of the convolution operations on a portion of a layer in the CNN (e.g., the portion of layer associated with a corresponding partial tensor 510(1) through 510(N), or a corresponding partial tensor 515(1) through 515(N) in FIG. 5), and the layer may be identified by the corresponding task descriptor. A subset of convolution operations on a portion of a layer is referred to herein as a "subtask."

When task DMA 604 reads new data 602 (e.g., from system memory 230), a header of new data 602 may include information regarding whether a payload of new data 602 includes a task descriptor or subtask descriptors. In case when the payload of new data 602 includes a task descriptor, the header of new data 602 may further include an address 614 where the payload of new data 602 (e.g., task descriptor 616) should be stored in task memory 606. In such case, task DMA 604 may send, to task memory 606, task descriptor 616 and address 614 where task descriptor 616 should be stored in task memory 606. Information about address 614 may be provided to task memory 606, e.g., via multiplexer 612 as address 618. In case when the payload of new data 602 includes subtask descriptors, no address is provided to task DMA 604, and subtask descriptors 620 are directly provided from task DMA 604 to subtask buffer 608 for storage.

Task memory 606 may store the list of task descriptors. During a computational cycle (e.g., clock cycle), task memory 606 may receive one or more task descriptors 616 from task DMA 604, and store one or more task descriptor 616 in task memory 606 at one or more addresses 618. Task memory 606 may also be coupled to one or more control registers of neural engine 314 (e.g., register(s) of NE control 418). Task memory 606 may receive first data 622 from the one or more control registers, and use received first data 622 to update a corresponding task descriptor in task memory 606 after each subtask is finished. Additionally or alternatively, task memory 606 may pass second data 622 to the one or more control registers with information about a particular task descriptor in task memory 606 for configuring neural engine 314 to perform a next subtask associated with the particular task descriptor. Task memory 606 may be embodied as any type of memory including, for example, DRAM, SDRAM, DDR, RDRAM, SRAM or a combination thereof. A size of task memory 606 may be large enough to hold, e.g., tens of task descriptors. A size of each task descriptor may be, e.g., approximately 120 bytes, and a size of task memory 606 may be, e.g., approximately 5 Kbytes or less than 10 Kbytes.

Subtask buffer 608 may store the list of subtask descriptors. During a computational cycle (e.g., clock cycle), subtask buffer 608 may receive one or more subtask descriptors 620 from task DMA 604, and store one or more subtask descriptors 620. Subtask buffer 608 may be, e.g., a first-input first-output (FIFO) buffer. Subtask buffer 608 may feed a first index 624 (e.g., task index or task pointer) of a subtask descriptor 620 to task manager controller 610, which can be used at task manager controller 610 to read a corresponding task descriptor from task memory 606. Subtask buffer 608 may also feed a second index 626 (e.g., "number of rounds" pointer) of subtask descriptor 620 to task manager controller 610 to relay information about a number of rounds of computations (e.g., convolutions) to be executed during a subtask represented by subtask descriptor 620. A size of each subtask descriptor 620 may be, e.g., approximately 10 bits corresponding to a total size of the task pointer and the "number of rounds" pointer in subtask descriptor 620. A size of subtask buffer 608 may be large enough to store, e.g., hundreds of subtask descriptors 620, e.g., less than 1 Kbytes.

Task manager controller 610 may control operations of task DMA 604, task memory 606 and subtask buffer 608. Task manager controller 610 may further configure neural engine 314 for execution of each subtask represented by each subtask descriptor 620 stored in subtask buffer 608 using information from a corresponding task descriptor stored in task memory 606. Task manager controller 610 may control operations of task DMA 604 by throttling task DMA 604 when there are still unprocessed subtask descriptors stored inside subtask buffer 608. When subtask buffer 608 becomes empty, task manager controller 610 may send a request signal 634 to task DMA 604 for requesting task DMA 604 to read next data 602 from an external source (e.g., system memory 230).

Task manager controller 610 may be responsible for starting execution of a subtask, and for updating a corresponding task descriptor in task memory 606 after the subtask is executed. Task manager controller 610 may start reading subtask descriptors from subtask buffer 608 one by one. To start executing the subtask, task manager controller 610 may read first index 624 (or task index) and second index 626 (or number of rounds) from one subtask descriptor in subtask buffer 608. For example, task manager controller 610 may determine that a subtask is to run a certain number of rounds (identified by second index 626) of a corresponding task descriptor in task memory 606 (identified by first index 624). Then, task manager controller 610 may generate, using first index 624, a read address 628 for reading corresponding data 622 from the corresponding task descriptor in task memory 606 identified by first index 624. Data 622 read from the corresponding task descriptor may be used to update the one or more control registers of neural engine 314 (e.g., register(s) of NE control 418) to prepare neural engine 314 for execution of the subtask.

Upon execution of the subtask, task manager controller 610 may also update one or more parameters in the corresponding task descriptor with data 636 read from register(s) of neural engine 314 (e.g., register(s) of NE control 418). Data 636 received by task manager controller 610 may further include information that the execution of the subtask is done. Task manager controller 610 may update the corresponding task descriptor in task memory 606 with an address 630 of partial tensor data for usage by a next subtask represented by a next subtask descriptor in subtask buffer 608 that identifies the corresponding task descriptor. Task manager controller 610 may provide updated address 630 to the corresponding task descriptor as part of information within address 618 provided to task memory 606 via multiplexer 612 by activating a select signal 632.

This step helps updating the corresponding task descriptor in task memory 606 to be ready for the next time when the next subtask identifying the corresponding task descriptor will be executed for the additional number of rounds, and consequently, minimizing the amount of information each subtask descriptor in subtask buffer 608 should contain. During the time when task manager controller 610 updates the corresponding task descriptor to be ready for the next time the corresponding task descriptor will be executed, a new subtask that is not related to the corresponding task descriptor (e.g., represented by a subtask descriptor identifying some other task descriptor in task memory 606) may be executed at neural engine 314. To achieve this, after the current subtask is finished, last value(s) of one or more registers in neural engine 314 (e.g., register(s) in NE control 418) may be copied into one or more "shadow registers" of neural engine 314. Task memory 606 may be updated with value(s) stored in the one or more shadow registers while the new subtask is running on neural engine 314 in the background.

Figure 7A:
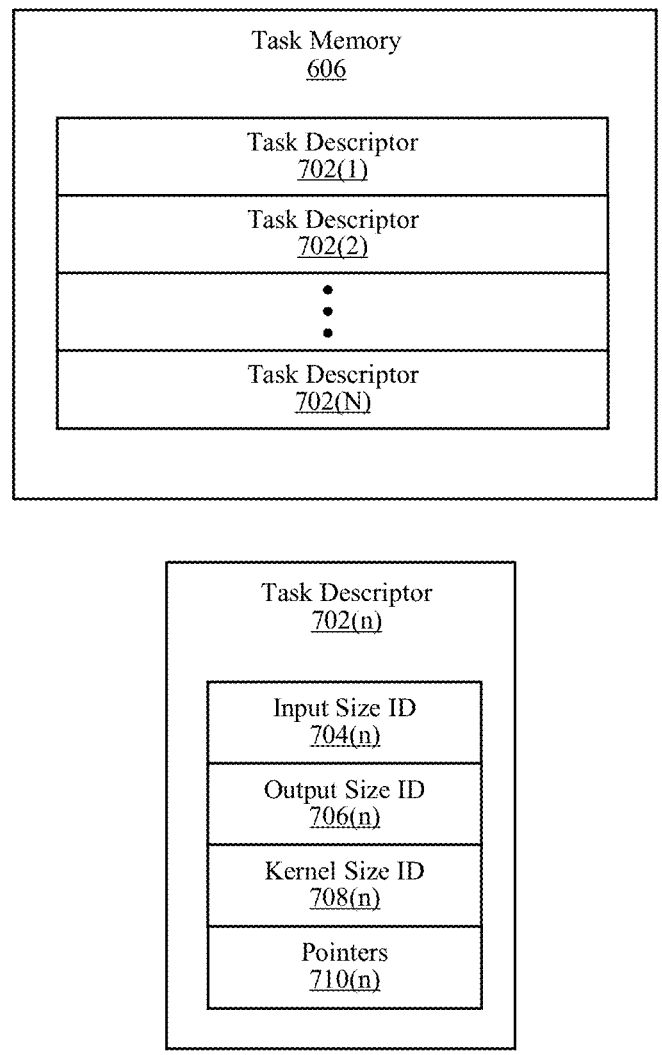
FIG. 7A illustrates an example task memory in the neural task manager of FIG. 6, according to one embodiment.

FIG. 7A illustrates an example task memory 606 in neural task manager 310, according to one embodiment. Task memory 606 may store a list of task descriptors, e.g., task descriptors 702(1), 702(2), . . . , 702(N), where N is a number of convolution layers (e.g., in streaming inference 500 in FIG. 5). Each task descriptor 702($n$) (n=1, 2, . . . , N) may thus identify a respective set of convolution operations of a respective convolution layer. Task descriptor 702($n$) may include an input size identifier (ID) 704($n$), an output size ID 706($n$), a kernel size ID 708($n$), and one or more pointers 710($n$), n=1, 2, . . . , N. Task descriptor 702($n$) may include some additional fields not shown in FIG. 7A. Alternatively, some of the fields of task descriptor 702($n$) may be grouped into a single field in task descriptor 702($n$). Input size ID 704($n$) may identify a size of a partial input tensor to be used for a next subset of convolution operations on a corresponding portion of the n-th layer. Output size ID 706($n$) may identify a size of a partial output tensor to be generated by the next subset of convolution operations. Kernel size ID 708($n$) may identify a size of a kernel to be used for the next subset of convolution operations. Pointer(s) 710($n$) may include data for one or more registers in neural engine 314 (e.g., register(s) in NE control 418) for configuring neural engine 314 to execute the next subset of convolution operations, such as information about an address of the partial input tensor in buffer memory 334 used for the next subset of convolution operations.

Figure 7B:
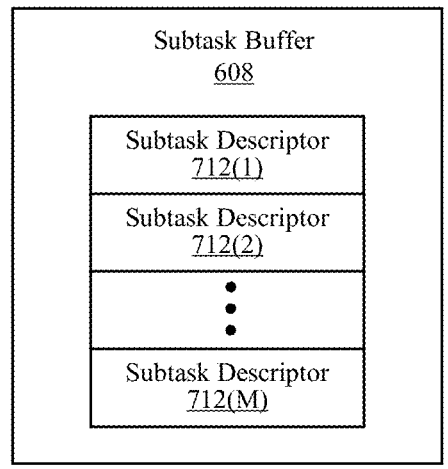
FIG. 7B illustrates an example subtask buffer in the neural task manager of FIG. 6, according to one embodiment.
Figure 7B:
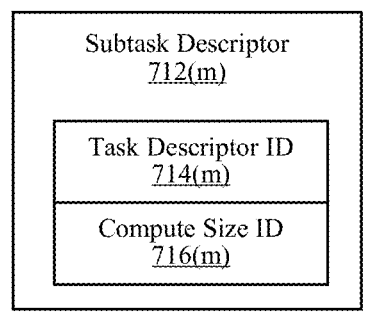

FIG. 7B illustrates an example subtask buffer 608 in neural task manager 310, according to one embodiment. Subtask buffer 608 may store a list of subtask descriptors, e.g., subtask descriptors 712(1), 712(2), . . . , 712(M), where M is a number of subtasks stored in subtask buffer 608, which may correspond to a total number of subtasks in streaming convolution operations (e.g., a total number of portions of layers in streaming inference 500). A subtask descriptor 712($m$) includes a task descriptor ID 714($m$) (e.g., first index 624) and a compute size ID 716($m$) (e.g., second index 626), where m=1, 2, . . . , M. Task descriptor ID 714($m$) may identify to which one of the task descriptors 702(1) through 702(n) subtask descriptor 712(m) corresponds to. Compute size ID 716(m) may identify a number of rounds of computations (e.g., convolutions) performed during the m-th subtask represented by subtask descriptor 712(m).

In some embodiments, neural engine 314 performs a current subtask represented by a subtask descriptor 712(m) (e.g., a subset of convolution operations on a portion of a layer) that identifies task descriptor 702(n). The current subtask may be performed on input data 322 (e.g., a partial input tensor) having an input size identified by input size ID 704(n) to generate output data 328 (e.g., a partial output tensor) having an output size identified by output size ID 706(n). Output data 328 may be stored in buffer memory 334 for access by neural engine 314 as input data 322 for another subtask (e.g., another subset of the convolution operations) represented by another subtask descriptor 712(m') (m'≠m) that identifies the same task descriptor 702(n). Pointer(s) 710(n) of task descriptor 702(n) may be updated with information about, e.g., an address of output data 328 in buffer memory 334.

In some other embodiments, in the streaming mode, neural engine 314 performs, using information from a subtask descriptor 712(1) and from a task descriptor 702(1) identified by subtask descriptor 712(1) (e.g., by task descriptor ID 714(1)), a first subset of convolution operations on a first portion of a first input tensor (e.g., first portion 510(1)) of a first portion of a first layer (e.g., layer 505(1)) to generate a first portion of a first output tensor (e.g., first portion 510(2)) at a first time. The first portion of the first output tensor (e.g., first portion 510(2)) may correspond to a first portion of a second input tensor of a second layer (e.g., layer 505(2)). A size of the first portion of first input tensor may be identified by input size ID 704(1), and a size of the first portion of first output tensor may be identified by output size ID 706(1). Neural engine 314 may further perform, using information from a subtask descriptor 712(2) and from a task descriptor 702(2) identified by subtask descriptor 712(2) (e.g., by task descriptor ID 714(2)), a second subset of the convolution operations on the first portion of the second input tensor (e.g., first portion 510(2)) of a first portion of a second layer (e.g., layer 505(2)) at a higher hierarchy than the first layer at a second time subsequent to the first time. This process of streaming convolution operations composed of multiple streaming subtasks can be performed for all layers 505(1) through 505(N) in streaming inference 500 and through multiple passes through each layer 505(1) through 505(N) until all output data 328 are generated, as described above in relation to FIG. 5.

Example Processes for Streaming Convolutions

Figure 8:
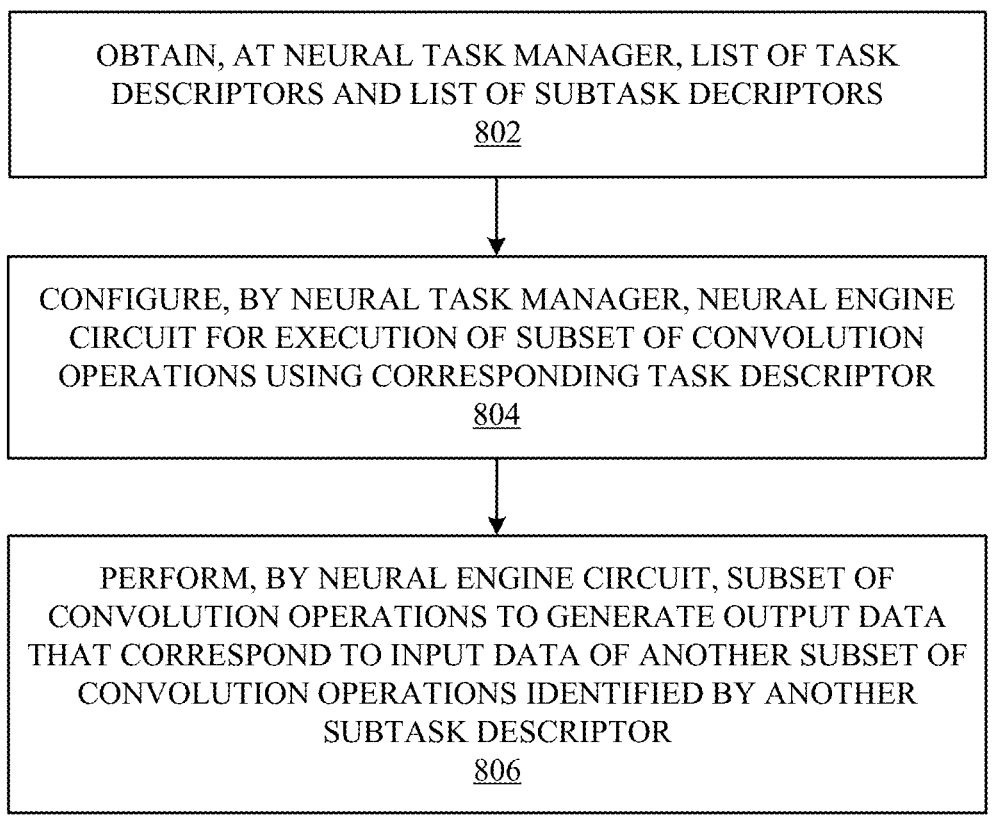
FIG. 8 is a flowchart illustrating a method of performing streaming convolution operations in the neural processor circuit, according to one embodiment.

FIG. 8 is a flowchart illustrating a method of performing streaming convolution operations in a neural processor circuit, according to one embodiment. The neural processor circuit obtains 802 (e.g., at neural task manager 310) a list of task descriptors and a list of subtask descriptors. Each task descriptor in the list may identify a respective set of convolution operations of a respective layer of a set of layers. Each subtask descriptor in the list may identify a corresponding task descriptor and a subset of the convolution operations on a portion of a layer (e.g., a subtask) in the set of layers identified by the corresponding task descriptor. Each subtask descriptor may include a first index and a second index. The first index may indicate to which one of the task descriptors each subtask descriptor corresponds to. The second index may indicate a number of rounds of computations performed during the subset of the convolution operations. The neural processor circuit may load (e.g., via neural task manager 310) the list of task descriptors and the list of subtask descriptors from a system memory (e.g., system memory 230) coupled to the neural processor circuit. The neural processor circuit may further store (e.g., at neural task manager 310) the list of task descriptors and the list of subtask descriptors loaded from the system memory.

The neural processor circuit configures 804 (e.g., via neural task manager 310) a neural engine circuit (e.g., neural engine 314) for execution of the subset of the convolution operations using the corresponding task descriptor. The neural processor circuit may configure (e.g., via neural task manager 310) the neural engine circuit for execution of the subset of the convolution operations by updating one or more registers of the neural engine circuit. The neural processor circuit may read (e.g., via neural task manager 310) the first index and the second index from each subtask descriptor. The neural processor circuit may further read (e.g., via neural task manager 310) information from the corresponding task descriptor using the first index. The neural processor circuit may configure (e.g., via neural task manager 310) the neural engine circuit for execution of the subset of the convolution operations using the second index and the information read from the corresponding task descriptor. Upon execution of the subset of the convolution operations, the neural processor circuit may update (e.g., via neural task manager 310) one or more parameters in the corresponding task descriptor for preparing execution of a next subset of the convolution operations (e.g., next subtask) associated with a next subtask descriptor in the list of subtask descriptors that identifies the corresponding task descriptor. The neural processor circuit may further update (e.g., via neural task manager 310) the one or more parameters in the corresponding task descriptor with information about, e.g., an address of a portion of an input tensor for execution of the next subset of the convolution operations.

The neural processor circuit performs 806 (e.g., by neural engine 314) the subset of the convolution operations to generate output data that correspond to input data of another subset of the convolution operations identified by another subtask descriptor in the list of subtask descriptors. The neural processor circuit may perform (e.g., by neural engine 314), using information from a first subtask descriptor and from a first task descriptor identified by the first subtask descriptor, a first subset of the convolution operations on a portion of a first input tensor of a portion of a first layer to generate a portion of a first output tensor at a first time, the portion of the first output tensor corresponding to a portion of a second input tensor. The neural processor circuit may further perform (e.g., by neural engine 314), using information from a second subtask descriptor and from a second task descriptor identified by the second subtask descriptor, a second subset of the convolution operations on the portion of the second input tensor of a portion of a second layer at a higher hierarchy than the first layer at a second time subsequent to the first time. The neural processor circuit may send (e.g., via data processor circuit 318) the portion of the first input tensor from a buffer memory (e.g., buffer memory 334) to the neural engine circuit. The neural processor circuit may further store the portion of the first output tensor in the buffer memory for access by the neural engine circuit as the portion of the second input tensor to perform the second subset of the convolution operations at the second time.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A neural processor circuit, comprising:
a neural engine circuit configured to perform a plurality of convolution operations of a plurality of layers in a streaming mode; and
a neural task manager configured to:
obtain a plurality of task descriptors and a plurality of subtask descriptors, each of the plurality of task descriptors identifying a respective set of the plurality of convolution operations of a respective layer of the plurality of layers, each of the plurality of subtask descriptors identifying a corresponding task descriptor of the plurality of task descriptors and a subset of the plurality of convolution operations on a portion of a layer of the plurality of layers identified by the corresponding task descriptor, and
configure the neural engine circuit for execution of the subset of the plurality of convolution operations using the corresponding task descriptor,
wherein, in the streaming mode, the neural engine circuit is configured to perform the subset of the plurality of convolution operations to generate output data that correspond to input data of another subset of the plurality of convolution operations identified by another subtask descriptor of the plurality of subtask descriptors.

2. The neural processor circuit of claim 1, wherein, in the streaming mode, the neural engine circuit is further configured to:
perform, using information from a first subtask descriptor of the plurality of subtask descriptors and from a first task descriptor of the plurality of task descriptors identified by the first subtask descriptor, a first subset of the plurality of convolution operations on a portion of a first input tensor of a portion of a first layer of the plurality of layers to generate a portion of a first output tensor at a first time, the portion of the first output tensor corresponding to a portion of a second input tensor; and
perform, using information from a second subtask descriptor of the plurality of subtask descriptors and from a second task descriptor of the plurality of task descriptors identified by the second subtask descriptor, a second subset of the plurality of convolution operations on the portion of the second input tensor of a portion of a second layer of the plurality of layers at a higher hierarchy than the first layer at a second time subsequent to the first time.

3. The neural processor circuit of claim 2, further comprising a data processor circuit coupled to the neural engine circuit, the data processor circuit configured to:
send the portion of the first input tensor from a buffer memory of the data processor circuit to the neural engine circuit; and
store the portion of the first output tensor in the buffer memory for access by the neural engine circuit as the portion of the second input tensor to perform the second subset of the plurality of convolution operations at the second time.

4. The neural processor circuit of claim 1, wherein the neural task manager comprises a task manager controller configured to:
update, upon execution of the subset of the plurality of convolution operations, one or more parameters in the corresponding task descriptor for preparing execution of a next subset of the plurality of convolution operations associated with a next subtask descriptor of the plurality of subtask descriptors that identifies the corresponding task descriptor.

5. The neural processor circuit of claim 4, wherein the task manager controller is further configured to:
update the one or more parameters in the corresponding task descriptor with information about an address of a portion of an input tensor for execution of the next subset of the plurality of convolution operations.

6. The neural processor circuit of claim 1, wherein the neural task manager comprises:
a task memory access circuit configured to load the plurality of task descriptors and the plurality of subtask descriptors from a system memory coupled to the neural processor circuit;
a task memory coupled to the task memory access circuit, the task memory configured to store the plurality of task descriptors received from the task memory access circuit; and
a subtask buffer coupled to the task memory access circuit, the subtask buffer configured to store the plurality of subtask descriptors received from the task memory access circuit.

7. The neural processor circuit of claim 1, wherein the neural task manager comprises a task manager controller configured to:
read a first index and a second index from each of the plurality of subtask descriptors;
read information from the corresponding task descriptor using the first index; and
configure the neural engine circuit for execution of the subset of the plurality of convolution operations using the second index and the information read from the corresponding task descriptor.

8. The neural processor circuit of claim 1, wherein the neural task manager comprises a task manager controller configured to:
configure the neural engine circuit for execution of the subset of the plurality of convolution operations by updating one or more registers of the neural engine circuit.

9. The neural processor circuit of claim 1, wherein each of the plurality of subtask descriptors includes a first index and a second index, the first index indicating to which one of the plurality of task descriptors each of the plurality of subtask descriptors corresponds to, and the second index indicating a number of rounds of computations performed in the subset of the plurality of convolution operations.

10. A method of operating a neural processor circuit, comprising:
obtaining a plurality of task descriptors and a plurality of subtask descriptors, each of the plurality of task descriptors identifying a respective set of a plurality of convolution operations of a respective layer of a plurality of layers, each of the plurality of subtask descriptors identifying a corresponding task descriptor of the plurality of task descriptors and a subset of the plurality of convolution operations on a portion of a layer of the plurality of layers identified by the corresponding task descriptor;

configuring a neural engine circuit of the neural processor circuit for execution of the subset of the plurality of convolution operations using the corresponding task descriptor; and performing, by the neural engine circuit, the subset of the plurality of convolution operations to generate output data that correspond to input data of another subset of the plurality of convolution operations identified by another subtask descriptor of the plurality of subtask descriptors.

11. The method of claim 10, further comprising:

performing, by the neural engine circuit using information from a first subtask descriptor of the plurality of subtask descriptors and from a first task descriptor of the plurality of task descriptors identified by the first subtask descriptor, a first subset of the plurality of convolution operations on a portion of a first input tensor of a portion of a first layer of the plurality of layers to generate a portion of a first output tensor at a first time, the portion of the first output tensor corresponding to a portion of a second input tensor; and performing, by the neural engine circuit using information from a second subtask descriptor of the plurality of subtask descriptors and from a second subtask descriptor of the plurality of task descriptors identified by the second subtask descriptor, a second subset of the plurality of convolution operations on the portion of the second input tensor of a portion of a second layer of the plurality of layers at a higher hierarchy than the first layer at a second time subsequent to the first time.

12. The method of claim 11, further comprising:

sending the portion of the first input tensor from a buffer memory of a data processor circuit of the neural processor circuit to the neural engine circuit; and storing the portion of the first output tensor in the buffer memory for access by the neural engine circuit as the portion of the second input tensor to perform the second subset of the plurality of convolution operations at the second time.

13. The method of claim 10, further comprising:

updating, upon execution of the subset of the plurality of convolution operations, one or more parameters in the corresponding task descriptor for preparing execution of a next subset of the plurality of convolution operations associated with a next subtask descriptor of the plurality of subtask descriptors that identifies the corresponding task descriptor.

14. The method of claim 13, further comprising:

updating the one or more parameters in the corresponding task descriptor with information about an address of a portion of an input tensor for execution of the next subset of the plurality of convolution operations.

15. The method of claim 10, further comprising:

loading the plurality of task descriptors and the plurality of subtask descriptors from a system memory coupled to the neural processor circuit;

storing the plurality of task descriptors in a task memory of the neural processor circuit; and storing the plurality of subtask descriptors in a subtask buffer of the neural processor circuit.

16. The method of claim 10, further comprising:

reading a first index and a second index from each of the plurality of subtask descriptors;

reading information from the corresponding task descriptor using the first index; and configuring the neural engine circuit for execution of the subset of the plurality of convolution operations using the second index and the information read from the corresponding task descriptor.

17. The method of claim 10, further comprising:

configuring the neural engine circuit for execution of the subset of the plurality of convolution operations by updating one or more registers of the neural engine circuit.

18. An electronic device, comprising:

a system memory; and a neural processor circuit coupled to the system memory, the neural processor circuit including:

a neural engine circuit configured to perform a plurality of convolution operations of a plurality of layers in a streaming mode; and a neural task manager configured to:

load a plurality of task descriptors and a plurality of subtask descriptors from the system memory, each of the plurality of task descriptors identifying a respective set of the plurality of convolution operations of a respective layer of the plurality of layers, each of the plurality of subtask descriptors identifying a corresponding task descriptor of the plurality of task descriptors and a subset of the plurality of convolution operations on a portion of a layer of the plurality of layers identified by the corresponding task descriptor, and configure the neural engine circuit for execution of the subset of the plurality of convolution operations using the corresponding task descriptor, wherein, in the streaming mode, the neural engine circuit is configured to perform the subset of the plurality of convolution operations to generate output data that correspond to input data of another subset of the plurality of convolution operations identified by another subtask descriptor of the plurality of subtask descriptors.

19. The electronic device of claim 18, wherein, in the streaming mode, the neural engine circuit is further configured to:

perform, using information from a first subtask descriptor of the plurality of subtask descriptors and from a first task descriptor of the plurality of task descriptors identified by the first subtask descriptor, a first subset of the plurality of convolution operations on a portion of a first input tensor of a portion of a first layer of the plurality of layers to generate a portion of a first output tensor at a first time, the first output tensor corresponding to a portion of a second input tensor; and perform, using information from a second subtask descriptor of the plurality of subtask descriptors and from a second task descriptor of the plurality of task descriptors identified by the second subtask descriptor, a second subset of the plurality of convolution operations on the portion of the second input tensor of a portion of a second layer of the plurality of layers at a higher hierarchy than the first layer at a second time subsequent to the first time.

20. The electronic device of claim 18, wherein the neural task manager comprises a task manager controller configured to:

update, upon execution of the subset of the plurality of convolution operations, one or more parameters in the corresponding task descriptor with information about an address of a portion of an input tensor for preparing execution of a next subset of the plurality of convolution operations associated with a next subtask descriptor of the plurality of subtask descriptors, the next subtask descriptor identifies the corresponding task descriptor and the next subset of the plurality of convolution operations uses the portion of the input tensor.

* * * * *